(12) United States Patent
Adachi et al.

(10) Patent No.: US 11,858,146 B2
(45) Date of Patent: Jan. 2, 2024

(54) WORKING METHOD AND ROBOT SYSTEM

(71) Applicant: SEIKO EPSON CORPORATION, Tokyo (JP)

(72) Inventors: Nahomi Adachi, Chino (JP); Hiroaki Shimizu, Suwa (JP); Masaki Miyasaka, Chino (JP); Kazufumi Oya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 246 days.

(21) Appl. No.: 17/386,566

(22) Filed: Jul. 28, 2021

(65) Prior Publication Data
US 2022/0032466 A1 Feb. 3, 2022

(30) Foreign Application Priority Data

Jul. 29, 2020 (JP) .................... 2020-128000

(51) Int. Cl.
B25J 9/16 (2006.01)
B25J 13/08 (2006.01)
B25J 15/00 (2006.01)

(52) U.S. Cl.
CPC ............. *B25J 9/1679* (2013.01); *B25J 9/162* (2013.01); *B25J 13/082* (2013.01); *B25J 15/0028* (2013.01)

(58) Field of Classification Search
CPC ........ B25J 9/162; B25J 9/1638; B25J 9/1679; B25J 13/082; B25J 15/0028
See application file for complete search history.

(56) References Cited

U.S. PATENT DOCUMENTS

| 2009/0199385 | A1 | 8/2009 | Maruo et al. | |
| 2011/0320038 | A1* | 12/2011 | Motoki | B25J 19/0008 901/46 |
| 2013/0013109 | A1* | 1/2013 | Brudniok | B25J 19/0008 700/254 |
| 2021/0154866 | A1* | 5/2021 | Wells | B25J 9/108 |

FOREIGN PATENT DOCUMENTS

| CN | 1819893 | A | 8/2006 | |
| CN | 203843841 | U | 9/2014 | |
| EP | 3078460 | A1 * | 10/2016 | .......... B25J 19/0008 |
| JP | 2009262304 | A | 11/2009 | |

* cited by examiner

*Primary Examiner* — Saul Rodriguez
*Assistant Examiner* — Brendan P Tighe
(74) *Attorney, Agent, or Firm* — Gang Yu

(57) ABSTRACT

A working method of performing work with increase or decrease in weight on an object by a robot system having a robot, a first hand with an assist device, and a second hand without the assist device, includes switching between an assisted work state in which the first hand is coupled to the robot and work is performed with assistance by the assist device and a non-assisted work state in which the second hand is coupled to the robot and work is performed without assistance by the assist device according to a weight of the object.

11 Claims, 13 Drawing Sheets

WORKING METHOD AND ROBOT SYSTEM

The present application is based on, and claims priority from JP Application Serial Number 2020-128000, filed Jul. 29, 2020, the disclosure of which is hereby incorporated by reference herein in its entirety.

BACKGROUND

1. Technical Field

The present disclosure relates to a working method and a robot system.

2. Related Art

For example, JP-A-2009-262304 discloses a cargo transporter in which when a robot is coupled to a hand device attached to a distal end of a balancer arm, the robot grips and transports cargos as objects and when the robot is separated from the hand device, the robot performs other work. When the weight of the object is too large to be transported by the robot itself, the object may be smoothly transported with assistance from the balancer arm.

On the other hand, when the weight of the object is small to be transported by the robot itself, the drive speed of the robot is restricted by the balancer arm and smooth transportation of the object is harder due to the restriction. Accordingly, when the weight of the object changes during work, in the cargo transporter of JP-A-2009-262304, the smooth transportation of the object may be harder.

SUMMARY

A working method according to an aspect of the present disclosure is a working method of performing work with increase or decrease in weight on an object by a robot system having a robot, a first hand with an assist device, and a second hand without the assist device, the method including switching between an assisted work state in which the first hand is coupled to the robot and work is performed with assistance by the assist device and a non-assisted work state in which the second hand is coupled to the robot and work is performed without assistance by the assist device according to a weight of the object.

A working method according to an aspect of the present disclosure is a working method of performing work with increase or decrease in weight on an object by a robot system having a robot, a hand coupled to the robot and used, and an assist device assisting the robot, the method including switching between an assisted work state in which work is performed by the robot with assistance from the assist device and a non-assisted work state in which work is performed by the robot without assistance from the assist device according to a weight of the object.

A robot system according to an aspect of the present disclosure includes a robot, a first hand with an assist device, a second hand without the assist device, and a control apparatus controlling the robot with the first hand or the second hand coupled thereto to perform work with increase or decrease in weight on an object, wherein the control apparatus switches between an assisted work state in which the first hand is coupled to the robot and work is performed with assistance by the assist device and a non-assisted work state in which the second hand is coupled to the robot and work is performed without assistance by the assist device according to a weight of the object.

DESCRIPTION OF EXEMPLARY EMBODIMENTS

As below, a working method and a robot system according to the present disclosure will be explained in detail based on preferred embodiments shown in the accompanying drawings.

First Embodiment

Figure 1:
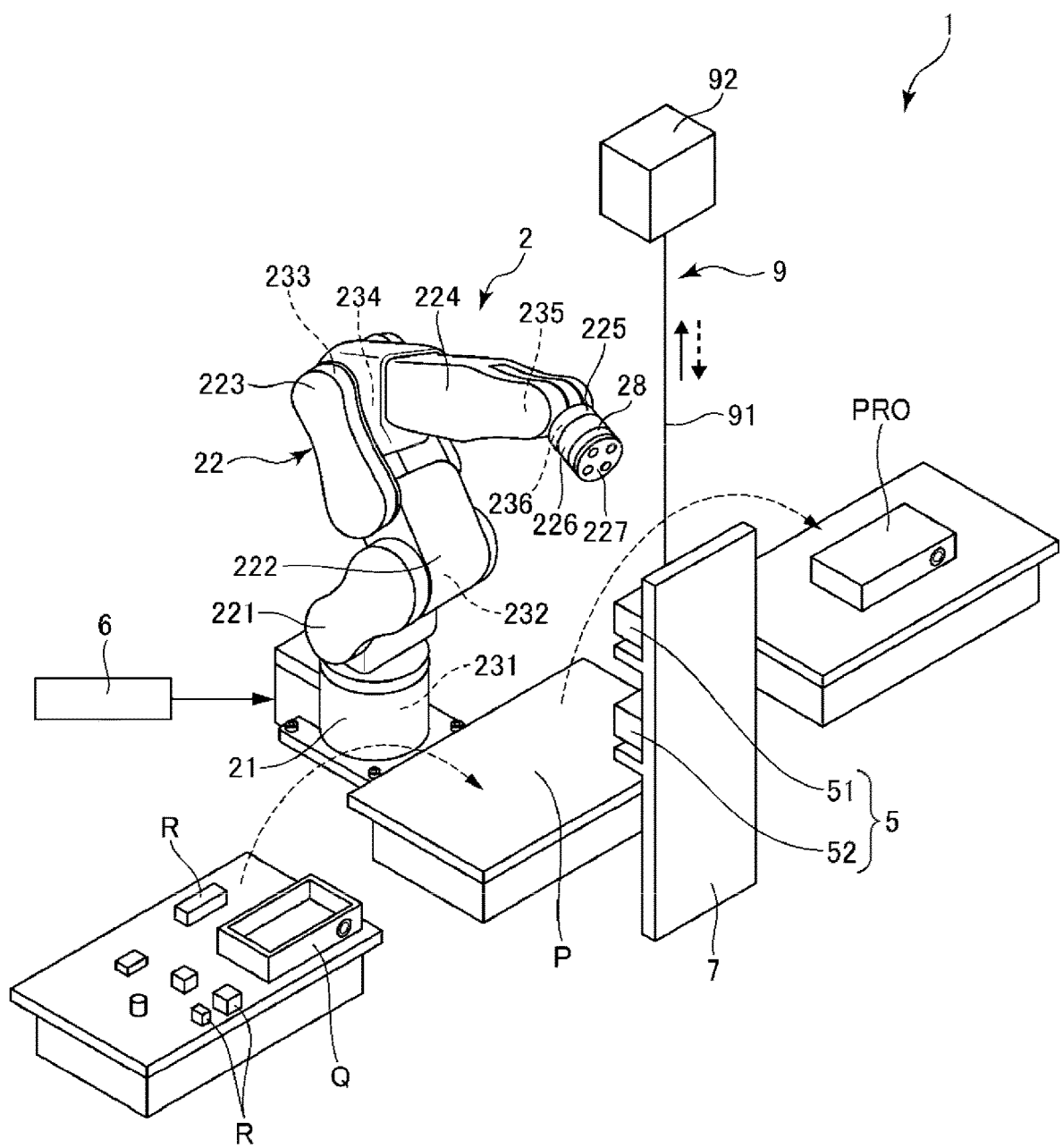
FIG. 1 is a perspective view showing an overall configuration of a robot system according to a first embodiment of the present disclosure.
Figure 2:
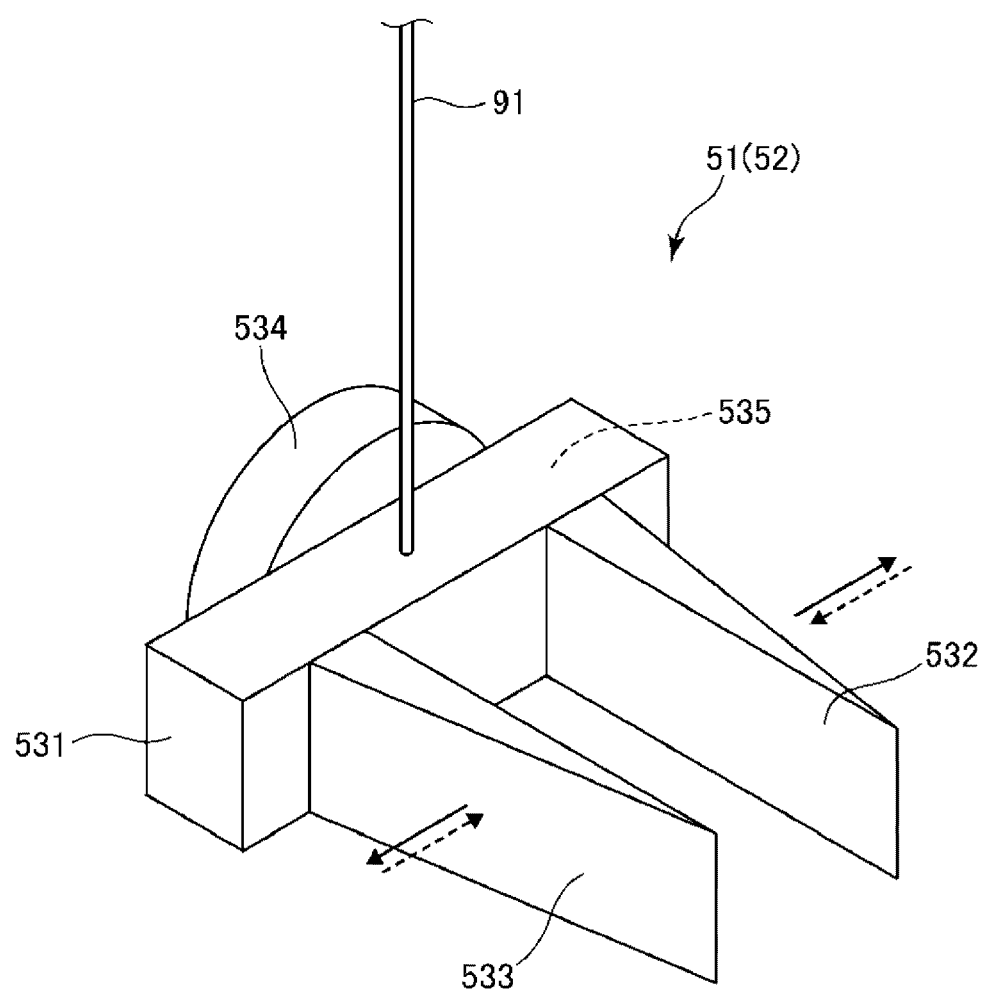
FIG. 2 is a perspective view showing a first hand and a second hand.
Figure 3:
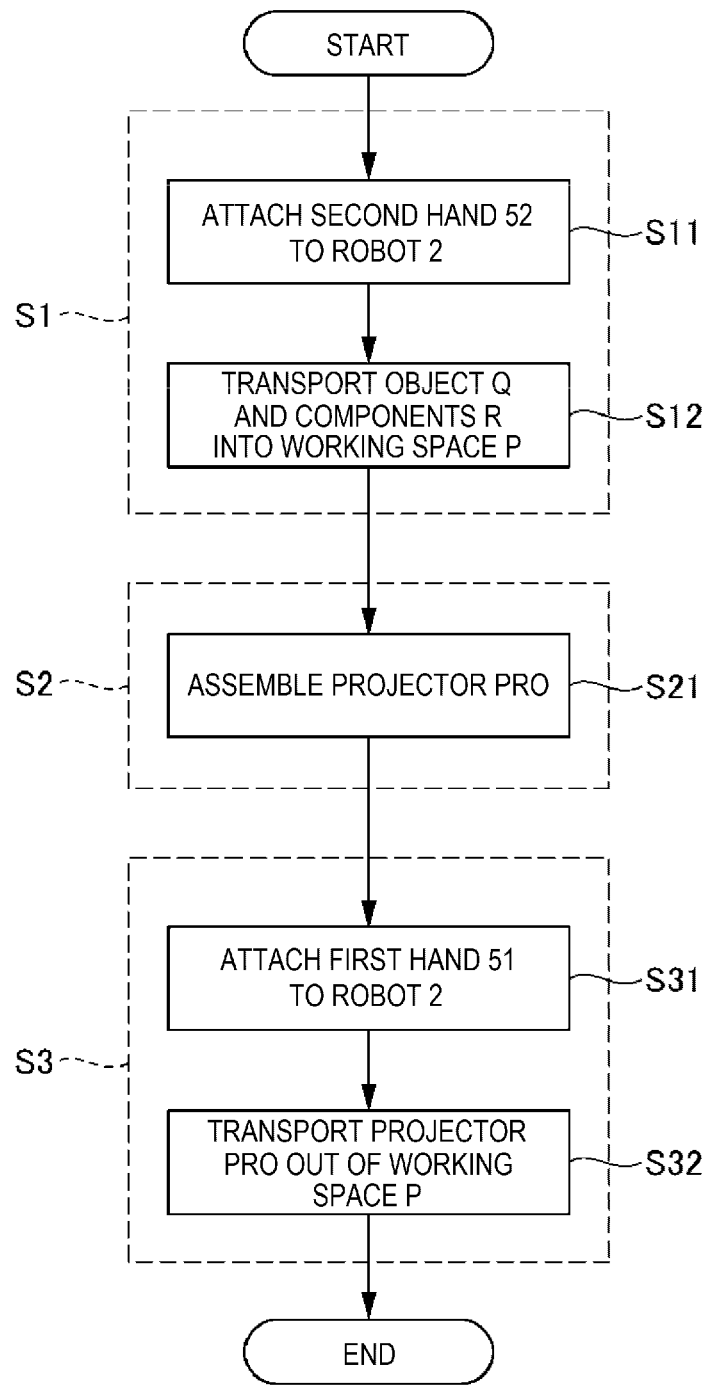
FIG. 3 is a flowchart showing a working process.
Figure 4:
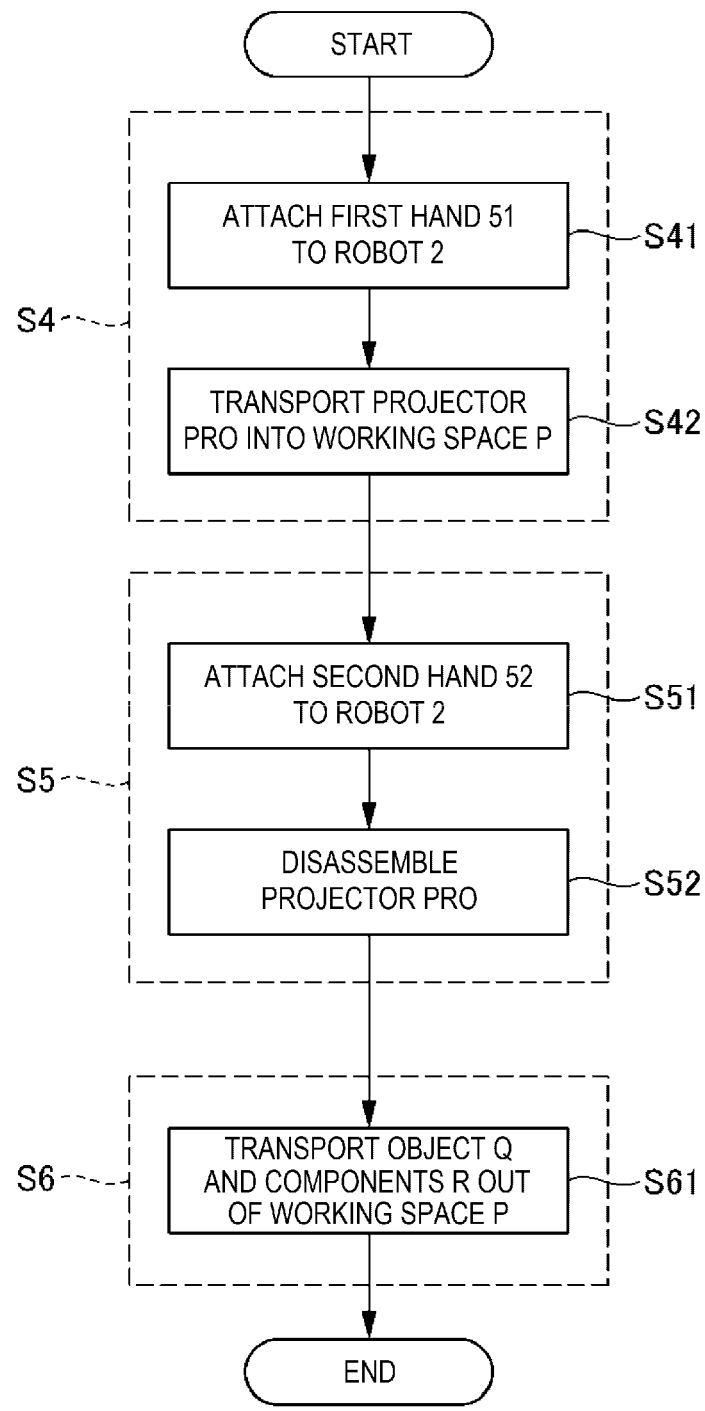
FIG. 4 is a flowchart showing a working process.

FIG. 1 is a perspective view showing an overall configuration of a robot system according to a first embodiment of the present disclosure. FIG. 2 is a perspective view showing a first hand and a second hand. FIGS. 3 and 4 are flowcharts respectively showing working processes.

A robot system 1 shown in FIG. 1 performs work of e.g. feeding, removal, transport, assembly, etc. of precision apparatuses and components forming the apparatuses. The robot system 1 has a robot 2, a hand group 5 including a plurality of hands, a control apparatus 6 that controls driving of the robot 2, and a hand temporarily fixing device 7. Further, in the robot system 1, one hand selected from the plurality of hands of the hand group 5, a first hand 51 and a second hand 52 in the embodiment, according to a weight of an object Q as a working object such as the precision apparatus or the component is attached to the robot 2 and work is performed.

As shown in FIG. 1, the robot 2 is a six-arm robot having six drive axes. The robot 2 has a base 21 fixed to a floor or a ceiling and an arm 22 pivotably coupled to the base 21. Further, the arm 22 has a first arm 221 pivotably coupled to the base 21, a second arm 222 pivotably coupled to the first arm 221, a third arm 223 pivotably coupled to the second arm 222, a fourth arm 224 pivotably coupled to the third arm 223, a fifth arm 225 pivotably coupled to the fourth arm 224, a sixth arm 226 pivotably coupled to the fifth arm 225, and a hand coupling portion 227 provided at a distal end side of the sixth arm 226. A hand according to work to be executed by the robot 2 is selected from the plurality of hands of the hand group 5 and attached to the hand coupling portion 227. Note that the hand coupling portion 227 includes e.g. a master plate of an automatic tool changer.

Further, the robot 2 has a force detection sensor 28 placed between the sixth arm 226 and the hand coupling portion 227. The force detection sensor 28 detects a force applied to the hand coupled to the hand coupling portion 227. The configuration of the force detection sensor 28 is not particularly limited, but may be e.g. a configuration having a pressure receiving member of crystal quartz and detecting the applied force based on magnitude of electric charge generated when the pressure receiving member receives the force. The placement of the force detection sensor 28 is not particularly limited as long as the sensor may detect the force applied to the hand. Or, the force detection sensor 28 may be omitted.

Furthermore, the robot 2 has a first arm pivot mechanism 231 placed in a joint portion between the base 21 and the first arm 221 and pivoting the first arm 221 relative to the base 21, a second arm pivot mechanism 232 placed in a joint portion between the first arm 221 and the second arm 222 and pivoting the second arm 222 relative to the first arm 221, a third arm pivot mechanism 233 placed in a joint portion between the second arm 222 and the third arm 223 and pivoting the third arm 223 relative to the second arm 222, a fourth arm pivot mechanism 234 placed in a joint portion between the third arm 223 and the fourth arm 224 and pivoting the fourth arm 224 relative to the third arm 223, a fifth arm pivot mechanism 235 placed in a joint portion between the fourth arm 224 and the fifth arm 225 and pivoting the fifth arm 225 relative to the fourth arm 224, and a sixth arm pivot mechanism 236 placed in a joint portion between the fifth arm 225 and the sixth arm 226 and pivoting the sixth arm 226 relative to the fifth arm 225. These first to sixth arm pivot mechanisms 231 to 236 include e.g. motors as drive sources, reducers, controllers controlling driving of the motors, encoders detecting amounts of displacement (pivot angles) of the arms, etc.

The hand group 5 has the plurality of hands. As shown in FIG. 1, in the embodiment, the hand group 5 has the first hand 51 and the second hand 52 as the plurality of hands. The first hand 51 and the second hand 52 have the same configuration except that an assist device 9 is provided for the first hand 51, but the assist device 9 is not provided for the second hand 52.

As shown in FIG. 2, each of the first hand 51 and the second hand 52 has a base portion 531, a pair of claw portions 532, 533 movably coupled to the base portion 531, and a claw portion opening and closing mechanism 535 that moves the pair of claw portions 532, 533 closer to and away from each other. Further, a robot coupling portion 534 to be coupled to the hand coupling portion 227 of the robot 2 is provided in the base portion 531. The robot coupling portion 534 includes e.g. a tool plate of an automatic tool changer. The claw portion opening and closing mechanism 535 includes e.g. a motor as a drive source, a reducer, a controller controlling driving of the motor, an encoder detecting amount of displacement (amount of movement) of the claw portion 532 or 533, etc. A coupling portion 91 of the assist device 9 is coupled only to the first hand 51.

In the first hand 51 and the second hand 52, the pair of claw portions 532, 533 are moved closer to each other to nip the object Q, thereby, may catch (grip) the object Q, and the pair of claw portions 532, 533 are moved away from each other, thereby, may release the gripped object Q. Note that the configurations of the first hand 51 and the second hand 52 are respectively not particularly limited, but may be any configurations suitable for work. For example, the first hand 51 and the second hand 52 may respectively have configurations that grip the object Q by another method such as vacuum suction or magnetic suction than nipping. Or, the configurations of the first hand 51 and the second hand 52 may be different from each other.

The hand group 5 may have at least one another hand in addition to the above described first hand 51 and second hand 52. In this case, as a third hand, a hand that grips the object Q in the same manner as the first hand 51 and the second hand 52 may be used, or a hand having various tools and performing various other kinds of work including screwing, cutting, deburring, finishing, welding, inspection, and imaging than gripping may be used.

As shown in FIG. 1, when the first hand 51 and the second hand 52 are not coupled to the robot 2, the hands are temporarily fixed to the hand temporarily fixing device 7. As described above, the unused hands are temporarily fixed to the hand temporarily fixing device 7 and storage of the hands is easier. Further, the hand and the robot 2 may be smoothly coupled and the attachment and detachment work of the hand to the robot 2 may be easier. Note that, not limited to the above described configuration, but the hand temporarily fixing device 7 may be omitted and the unused hands may be placed in predetermined positions and predetermined attitudes, or randomly placed in any positions and attitudes.

Next, the assist device 9 not provided for the second hand 52, but provided only for the first hand 51 will be explained. The assist device 9 hoists and supports the first hand 51, and thereby, gives assistance to the robot 2 to assist transportation of the object Q by the robot 2. The assist device 9 is not particularly limited, but includes, in the embodiment, as shown in FIGS. 1 and 2, a chain 91 with one end coupled to the first hand 51 and a hoisting device 92 placed on the ceiling and hoisting or feeding the chain 91 with the motion of the arm 22.

According to the assist device 9, when the robot 2 with the first hand 51 grips and transports the object Q, the hoisting device 92 hoists the chain 91 and supports the first hand 51, and thereby, a load transmitted from the object Q to the robot 2 may be reduced, preferably to zero. Therefore, the object Q may be smoothly transported by the robot 2. Further, the object Q having a weight that can be transported by the robot 2 or more may be transported by the robot 2. In other words, the heavier object Q can be transported using the robot 2 having lower transportable performance (transportable weight).

Note that the assist device 9 is not particularly limited as long as the device may exert the above described functions. For example, the hoisting device 92 may have a configuration movable along a rail or the like placed on the ceiling and moving according to the motion of the arm 22 automatically or while being pulled by the arm 22. Thereby, during work, the first hand 51 may be continuously supported from substantially directly above, and assistance may be given to the robot 2 more efficiently.

The control apparatus 6 respectively independently controls driving of the first arm pivot mechanism to sixth arm pivot mechanism 231 to 236, the claw portion opening and closing mechanism 535, and the hoisting device 92 based on e.g. commands from a host computer (not shown).

The control apparatus 6 includes e.g. a computer having a processor (CPU) that processes information, a memory communicably connected to the processor, and an external interface. Further, various programs that can be executed by the processor are stored in the memory and the processor may read and execute various programs stored in the memory etc.

As above, the configuration of the robot system 1 is briefly explained. Next, a working method using the robot system 1 will be explained. The control apparatus 6 switches between an assisted work state in which the first hand 51 is coupled to the robot 2 and work is performed with assistance by the assist device 9 and a non-assisted work state in which the second hand 52 is coupled to the robot 2 and work is performed without assistance by the assist device 9 according to the weight of the object Q.

As below, as shown in FIG. 3, an example of assembling a projector PRO by performing a first transport step S1 at which the robot 2 transports the object Q to a working space P, a working step S2 at which the robot 2 performs work with increase or decrease in weight on the object Q in the working space P, and a second transport step S3 at which the robot 2 transports the object Q after the working step S2 out of the working space P will be explained. In this example, for assembly of the projector PRO, at the working step S2, work with increase in weight is performed on the object Q.

At the first transport step S1, the object Q as a component and other components R of the projector PRO are transported to the working space P. Note that the components of the projector PRO include e.g. a light source that outputs light, a color separation optical device that separates the light into red, green, and blue, and a spatial light modulation device having liquid crystal panels for the respective colors and modulating luminous fluxes of the respective colors according to image signals, a prism that generates picture light by combining the luminous fluxes of the respective colors modulated by the spatial light modulation device, a projection lens that enlarges and projects the picture light generated by the prism at a desired enlargement factor, a cooling fan, and a package housing these respective components and having a housing and a lid member. Hereinafter, for convenience of explanation, the housing is the object Q and the other components are the components R.

In the embodiment, the object Q and the respective components R have weights equal to or less than a rated weight that can be transported by the robot 2. Accordingly, at the first transport step S1, as step S11, under control of the control apparatus 6, first, the hand coupling portion 227 of the robot 2 is coupled to the robot coupling portion 534 of the second hand 52 temporarily fixed to the hand temporarily fixing device 7 and the second hand 52 without the assist device 9 is attached to the robot 2. Then, as step S12, under control of the control apparatus 6, the object Q and the respective components R placed outside of the working space P are gripped by the second hand 52 and transported into the working space P by movement of the arm 22. That is, the work is performed in the non-assisted work state.

The object Q and the respective components R have the weights equal to or less than the rated weight, and can be transported only by the robot 2 without assistance by the assist device 9. Therefore, at the first transport step S1, the second hand 52 without the assist device 9 is selected as a hand attached to the robot 2 into the non-assisted work state, and thereby, the transport speeds of the object Q and the respective components R may be increased and the time taken for the step may be shortened.

At the working step S2, the projector PRO is assembled by packaging of the respective components R in the object Q transported into the working space P. Specifically, the light source, the color separation optical device, the spatial light modulation device, the prism, the projection lens, the cooling fan, etc. as the components R are sequentially packaged in predetermined locations of the housing as the object Q and finally sealed by the lid member, and thereby, the projector PRO is assembled. Also, at the step, gripping of the respective components R having the weights equal to or less than the rated weight, transportation to the predetermined locations, and packaging are performed, and the second hand 52 is used successively from the first transport step S1. That is, the work is performed in the non-assisted work state.

At the working step S2, as step S21, under control of the control apparatus 6, the projector PRO is assembled by sequentially gripping of the respective components R using the second hand 52 and packaging of the components in the predetermined locations of the housing as the object Q. Note that, in the middle of the working step S2, when work hard for the second hand 52 is necessary, the second hand 52 may grip a tool and perform the work at each time. Or, for example, when the hand group 5 has another third hand suitable for the work than the first, second hands 51, 52, the hand attached to the robot 2 is changed from the second hand 52 to the third hand and the work may be performed using the third hand.

In the embodiment, the projector PRO obtained at the working step S2 has a weight more than the rated weight that can be transported by the robot 2. Accordingly, the transportation of the projector PRO is difficult by the robot 2 itself. On this account, at the second transport step S3, as step S31, under control of the control apparatus 6, first, the second hand 52 is detached from the robot 2 and the first hand 51 is attached to the robot 2. Then, as step S32, under control of the control apparatus 6, the projector PRO placed within the working space P is gripped by the first hand 51 and transported out of the working space P by movement of the arm 22 with assistance by the assist device 9. That is, the work is performed in the assisted work state. Thereby, the projector PRO can be transported and the transportation may be smoothly performed.

Next, contrary to the above described example, a working method of disassembling the projector PRO including the object Q is explained. As shown in FIG. 4, this work dissembles the projector PRO by performing a first transport step S4 at which the robot 2 transports the projector PRO to the working space P, a working step S5 at which the robot 2 performs work with increase or decrease in weight on the projector PRO in the working space P, and a second transport step S6 at which the robot 2 transports the object Q after the working step S5 out of the working space P. In this example, for disassembly of the projector PRO, at the working step S4, the work with increase or decrease in weight is performed on the object Q.

At the first transport step S4, the projector PRO is transported to the working space P. In the embodiment, the projector PRO has a weight more than the rated weight. Accordingly, the transportation of the projector PRO is difficult by the robot 2 itself. On this account, at the first transport step S4, as step S41, under control of the control apparatus 6, first, the first hand 51 is attached to the robot 2. Then, as step S42, under control of the control apparatus 6, the projector PRO placed outside of the working space P is gripped by the first hand 51 and transported into the working space P by movement of the arm 22 with assistance by the assist device 9. That is, the work is performed in the assisted work state. Thereby, the projector PRO can be transported and the transportation may be smoothly performed.

At the working step S5, the projector PRO transported into the working space P is dissembled, and the object Q and the respective components R are removed from the housing and the respective parts are separated from one another. At this step, work of gripping and removing the object Q and the respective components R from the housing is performed. The object Q and the respective components R respectively have weights equal to or less than the rated weight, and this step may be performed by the robot 2 itself. Accordingly, at the working step S5, as step S51, under control of the control apparatus 6, first, the first hand 51 is detached from the robot 2 and the second hand 52 is attached to the robot 2. Then, as step S52, under control of the control apparatus 6, the projector PRO is disassembled using the second hand 52 and the object Q and the respective components R are separated from one another. That is, this work is performed in the non-assisted work state. As described above, the work is performed using the second hand 52 without the assist device 9 on the object Q and the respective components R having the weights equal to or less than the rated weight, and thereby, the working speed of the work may be increased and the time taken for the step may be shortened.

At the second transport step S6, the object Q and the respective components R are transported out of the working space P. As described above, the object Q and the respective components R respectively have weights equal to or less than the rated weight. Accordingly, also, at the step, the second hand 52 is used successively from the working step S5. That is, the work is performed in the non-assisted work state.

At the second transport step S6, as step S61, under control of the control apparatus 6, the object Q and the respective components R are sequentially gripped by the second hand 52 and transported out of the working space P by movement of the arm 22. As described above, the second hand 52 without the assist device 9 is selected as the hand attached to the robot 2, and thereby, the transportation speeds of the object Q and the respective components R may be increased and the time taken for the step may be shortened.

As in the above described assembly work and disassembly work, the assisted work state and the non-assisted work state are switched according to the weight of the object Q, and thereby, when necessary, the object Q may be transported more reliably with assistance from the assist device 9 and, when not necessary, the object Q may be transported more quickly without assistance from the assist device 9. Therefore, according to the working method, the transportation of the object Q may be smoothly performed. Particularly, as in the above described working method, work with increase in weight is performed on the object Q at the working step S2 and the object Q has the weight equal to or less than the rated weight before the working step S2, however, the projector PRO including the object Q has a weight more than the rated weight after the working step S2. As described above, when it is necessary to transport the object Q having the weight equal to or less than the rated weight at one of the first transport step S1 and the second transport step S3 and transport the object Q having the weight more than the rated weight at the other, if the assisted work state and the non-assisted work state may be switched, the above described merits of the working method may be especially enjoyed.

Particularly, in the embodiment, the robot 2 has the force detection sensor 28. Accordingly, the force applied to the force detection sensor 28 is fed back to the control apparatus 6, and thereby, for example, the coupling between the robot 2 and the first hand 51 or the second hand 52 may be performed at a lower failure frequency in a shorter time. Further, when the first hand 51 is attached to the robot 2 and the object Q having the weight more than the rated weight is gripped by the first hand 51, driving of the hoisting device 92 is controlled so that the force applied to the force detection sensor 28 may be smaller, preferably zero, and thereby, transportation of the object Q having the weight more than the rated weight may be performed more reliably and smoothly. For gripping and lifting the object Q, the weight of the object Q may be known from the force applied to the force detection sensor 28 and the hand may be changed to appropriate one.

As above, the robot system 1 and the working method using the robot system 1 are explained. As described above, the robot system 1 includes the robot 2, the first hand 51 with the assist device 9, the second hand 52 without the assist device 9, and the control apparatus 6 that controls the robot 2 with the first hand 51 or the second hand 52 attached thereto to perform work with increase or decrease in weight on the object Q. The control apparatus 6 switches between the assisted work state in which the first hand 51 is coupled to the robot 2 and work is performed with assistance by the assist device 9 and the non-assisted work state in which the second hand 52 is coupled to the robot 2 and work is performed without assistance by the assist device 9 according to the weight of the object Q. According to the system, when necessary, the object Q may be transported more reliably with assistance from the assist device 9 and, when not necessary, the object Q may be transported more quickly without assistance from the assist device 9. Therefore, the work may be smoothly performed.

Further, as described above, the robot 2 has the force detection sensor 28 that detects the force applied to the robot 2. Accordingly, the force applied to the force detection sensor 28 is fed back to the control apparatus 6, and thereby, for example, the coupling between the robot 2 and the first hand 51 or the second hand 52 may be performed at a lower failure frequency in a shorter time. Further, when the first hand 51 is attached to the robot 2 and the object Q having the weight more than the rated weight is gripped by the first hand 51, driving of the hoisting device 92 is controlled so that the force applied to the force detection sensor 28 may be smaller, and thereby, transportation of the object Q having the weight more than the rated weight may be performed more reliably and smoothly. For gripping and lifting the object Q, the weight of the object Q may be known from the force applied to the force detection sensor 28 and the hand may be changed to appropriate one.

As described above, the working method of performing work with increase or decrease in weight on the object Q by the robot system 1 having the robot 2, the first hand 51 with the assist device 9, and the second hand 52 without the assist device 9 includes switching between the assisted work state in which the first hand 51 is coupled to the robot 2 and work is performed with assistance by the assist device 9 and the non-assisted work state in which the second hand 52 is coupled to the robot 2 and work is performed without assistance by the assist device 9 according to the weight of the object Q. According to the method, when necessary, the object Q may be transported more reliably with assistance from the assist device 9 and, when not necessary, the object Q may be transported more quickly without assistance from the assist device 9. Therefore, the work may be smoothly performed.

Further, as described above, the working method has the first transport steps S1, S4 of transporting the object Q to the working space P by the robot 2, the working steps S2, S5 of performing work with increase or decrease in weight on the object Q by the robot 2 in the working space P, and the second transport steps S3, S6 of transporting the object Q after the working steps S2, S5 out of the working space P by the robot 2, and, at the first transport steps S1, S4 and the second transport steps S3, S6, the assisted work state and the non-assisted work state are switched according to the weight of the object Q. According to the method, when necessary, the object Q may be transported more reliably with assistance from the assist device 9 and, when not necessary, the object Q may be transported more quickly without assistance from the assist device 9. Therefore, the work may be smoothly performed.

Furthermore, as described above, when the weight of the object Q increases at the working step S2, the first transport step S1 is performed in the non-assisted work state and the second transport step S3 is performed in the assisted work state. Contrarily, when the weight of the object Q decreases at the working step S5, the first transport step S4 is performed in the assisted work state and the second transport step S6 is performed in the non-assisted work state. According to the method, the work may be smoothly performed.

Second Embodiment

Figure 5:
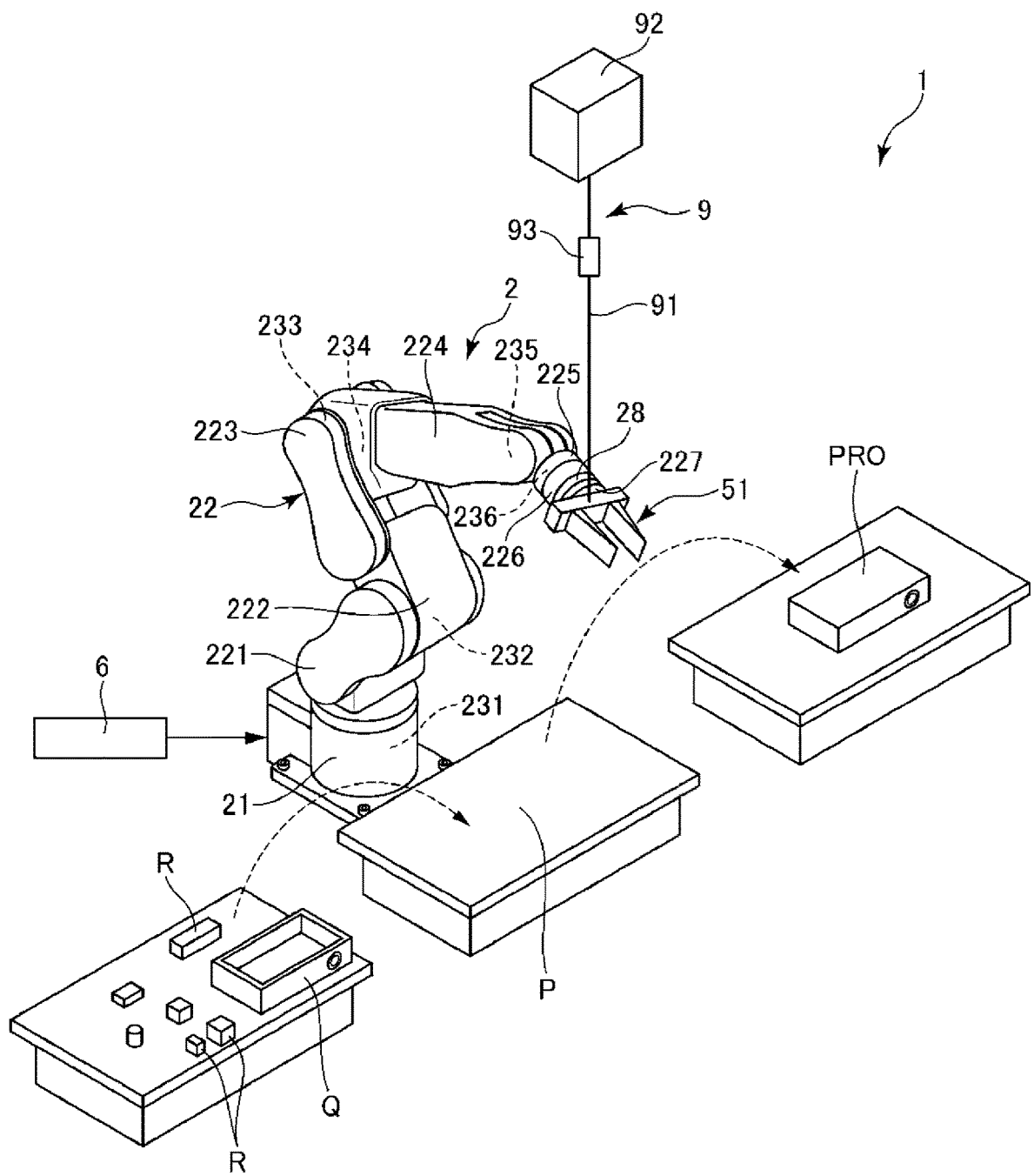
FIG. 5 is a perspective view showing an overall configuration of a robot system according to a second embodiment of the present disclosure.
Figure 6:
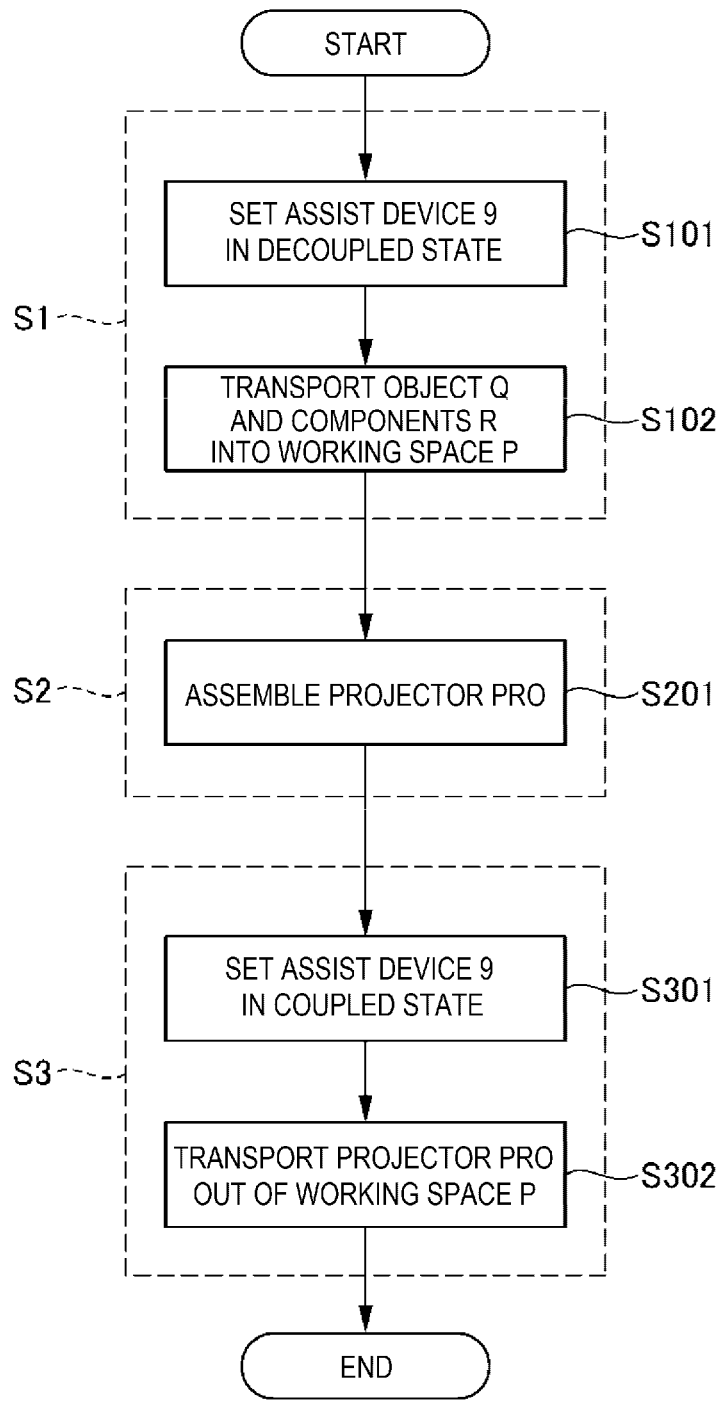
FIG. 6 is a flowchart showing a working process.
Figure 7:
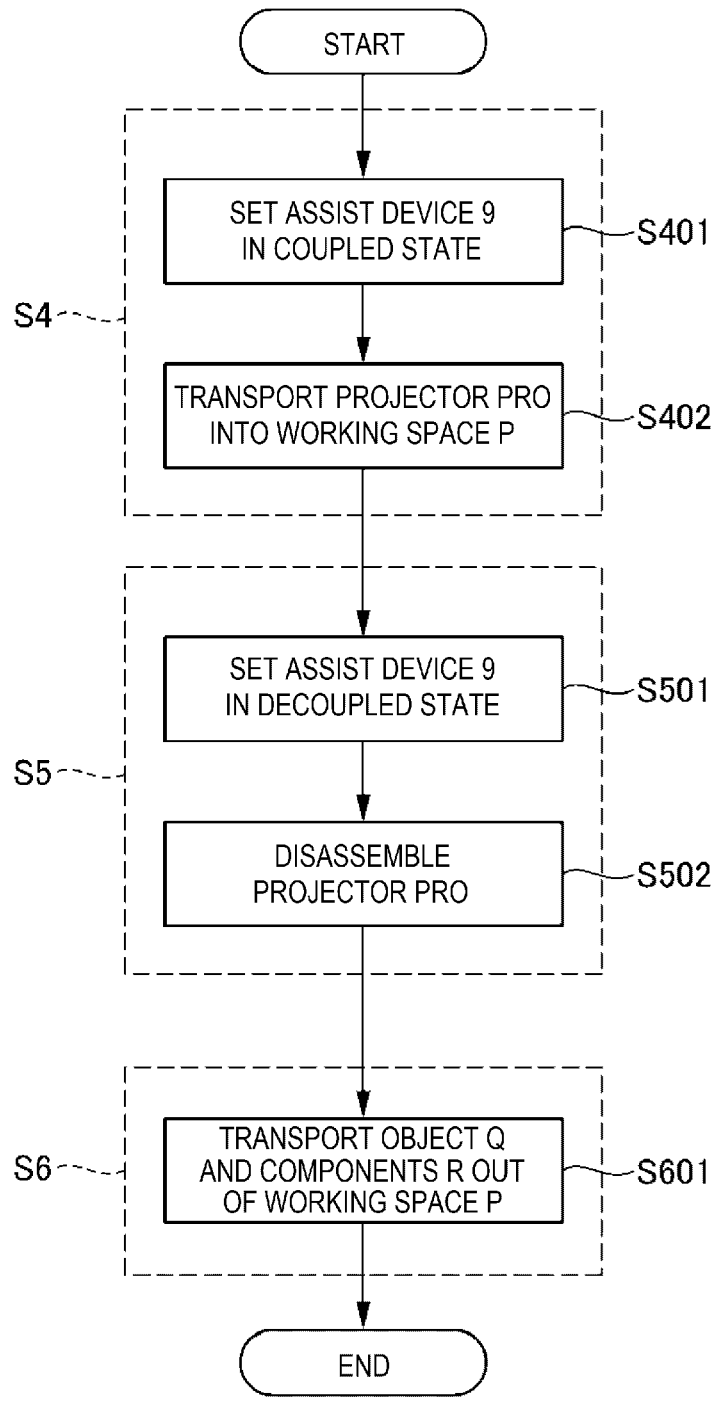
FIG. 7 is a flowchart showing a working process.

FIG. 5 is a perspective view showing an overall configuration of a robot system according to a second embodiment of the present disclosure. FIGS. 6 and 7 are flowcharts respectively showing working processes. FIGS. 8 to 12 respectively show examples of a switching mechanism.

A robot system 1 according to the embodiment is the same as the robot system 1 of the above described first embodiment except that the second hand 52 is omitted, the first transport steps S1, S4 and the second transport steps S3, S6 are performed using the first hand 51 having the assist device 9, and the configuration of the assist device 9 is different. Accordingly, in the following description, the robot system 1 of the second embodiment will be explained with a focus on the differences from the above described first embodiment and the explanation of the same items will be omitted. In FIGS. 5 to 12, the same configurations as those of the above described embodiment have the same signs.

As shown in FIG. 5, in the robot system 1 of the embodiment, the first hand 51 having the assist device 9 as a hand is attached to the robot 2. Further, the assist device 9 has the chain 91 with one end coupled to the first hand 51, the hoisting device 92 placed on the ceiling and hoisting the chain 91 with the motion of the arm 22, and a switching mechanism 93 of switching between a coupled state in which the robot 2 is assisted via the first hand 51 and a decoupled state in which the robot 2 is not assisted. The switching between the coupled state and the decoupled state is performed by the control apparatus 6.

Next, a working method using the robot system 1 will be explained. The control apparatus 6 switches between the coupled state in which the robot 2 is assisted via the first hand 51 and the decoupled state in which the robot 2 is not assisted according to the weight of the object Q. As below, as is the case with the above described first embodiment, as shown in FIG. 6, an example of assembling the projector PRO by performing the first transport step S1 at which the robot 2 transports the object Q to the working space P, the working step S2 at which the robot 2 performs work with increase or decrease in weight on the object Q in the working space P, and the second transport step S3 at which the robot 2 transports the object Q after the working step S2 out of the working space P will be explained. In this example, for assembly of the projector PRO, at the working step S2, work with increase in weight is performed on the object Q.

At the first transport step S1, the object Q as a component and other components R of the projector PRO are transported to the working space P. The object Q and the respective components R have weights equal to or less than a rated weight that can be transported by the robot 2. Accordingly, at the first transport step S1, as step S101, under control of the control apparatus 6, first, the assist device 9 is decoupled. When the assist device 9 is decoupled, the hoisting device 92 is fixed and the length of the switching mechanism 93 or the chain 91 varies according to the motion of the robot 2.

Then, as step S102, under control of the control apparatus 6, the object Q and the respective components R placed outside of the working space P are gripped by the first hand 51, and transported into the working space P by movement of the arm 22. That is, the work is performed in the non-assisted work state. The object Q and the respective components R have the weights equal to or less than the rated weight and can be transported only by the robot 2 without assistance from the assist device 9. Therefore, at the first transport step S1, the assist device 9 is decoupled, and thereby, the transport speeds of the object Q and the respective components R may be increased and the time taken for the step may be shortened.

At the working step S2, as step S201, under control of the control apparatus 6, the projector PRO is assembled by sequentially gripping of the respective components R using the first hand 51 and packaging of the components in predetermined locations of the housing as the object Q.

The projector PRO obtained at the working step S2 has a weight more than the rated weight that can be transported by the robot 2. Accordingly, the transportation of the projector PRO is difficult by the robot 2 itself. On this account, at the second transport step S3, as step S301, under control of the control apparatus 6, first, the assist device 9 is coupled. When the assist device 9 is coupled, the length of the switching mechanism 93 and the chain 91 are fixed and the hoisting device 92 executes an operation to hoist or feed the chain 91 according to the motion of the robot 2.

Note that, for example, when the degree of stretch of the switching mechanism 93 is larger, particularly, when the switching mechanism 93 is fully stretched, the hoisting device 92 may feed the chain 91 so that the degree of stretch of the switching mechanism 93 may be smaller before the assist device 9 is coupled. Thereby, the length of the chain 91 that can be hoisted in the coupled state may be made longer. Further, when the coupled state is changed to the decoupled state again, the switching mechanism 93 may be sufficiently stretched and is harder to hinder the motion of the robot 2.

Then, as step S302, under control of the control apparatus 6, the projector PRO placed within the working space P is gripped by the first hand 51 and transported out of the working space P by movement of the arm 22 with assistance by the assist device 9. That is, the work is performed in the assisted work state. Thereby, the projector PRO can be transported and the transportation may be smoothly performed.

Next, contrary to the above described example, a working method of disassembling the projector PRO including the object Q is explained. As shown in FIG. 7, this work dissembles the projector PRO by performing the first transport step S4 at which the robot 2 transports the projector PRO to the working space P, the working step S5 at which the robot 2 performs work with increase or decrease in weight on the projector PRO in the working space P, and the second transport step S6 at which the robot 2 transports the object Q after the working step S5 out of the working space P. In this example, for disassembly of the projector PRO, at the working step S4, the work with decrease in weight is performed on the object Q.

At the first transport step S4, the projector PRO is transported to the working space P. The projector PRO has a weight more than the rated weight. Accordingly, the transportation of the projector PRO is difficult by the robot 2 itself. On this account, at the first transport step S4, as step S401, under control of the control apparatus 6, first, the assist device 9 is coupled. When the assist device 9 is coupled, the length of the switching mechanism 93 and the chain 91 is fixed and the hoisting device 92 executes an operation to hoist or feed the chain 91 according to the motion of the robot 2.

Note that, for example, when the degree of stretch of the switching mechanism 93 is larger, particularly, when the switching mechanism 93 is fully stretched, the hoisting device 92 may feed the chain 91 so that the degree of stretch of the switching mechanism 93 may be smaller before the assist device 9 is coupled. Thereby, the length of the chain 91 that can be hoisted in the coupled state may be made longer. Further, when the coupled state is changed to the decoupled state again, the switching mechanism 93 may be sufficiently stretched and is harder to hinder the motion of the robot 2.

Then, as step S402, under control of the control apparatus 6, the projector PRO placed out of the working space P is gripped by the first hand 51 and transported into the working space P by movement of the arm 22 with assistance by the assist device 9. That is, the work is performed in the assisted work state. Thereby, the projector PRO can be transported and the transportation may be smoothly performed.

At the working step S5, the projector PRO transported into the working space P is disassembled, and the object Q and the respective components R are removed from the housing and the respective parts are separated from one another. The object Q and the respective components R respectively have weights equal to or less than the rated weight. Accordingly, the work may be performed only by the robot 2 without assistance from the assist device 9. Therefore, at the working step S5, as step S501, under control of the control apparatus 6, first, the assist device 9 is decoupled. When the assist device 9 is decoupled, the hoisting device 92 is fixed and the length of the switching mechanism 93 or the chain 91 varies according to the motion of the robot 2.

Then, as step S502, under control of the control apparatus 6, the projector PRO is disassembled using the first hand 51, and the object Q and the respective components R are separated from one another. That is, this work is performed in the non-assisted work state. As described above, the assist device 9 is decoupled, and thereby, the working speed of disassembly may be increased and the time taken for the step may be shortened.

At the second transport step S6, the object Q and the respective components R are transported out of the working space P. The object Q and the respective components R respectively have weights equal to or less than the rated weight. Accordingly, also, at the step, the assist device 9 is decoupled successively from the working step S5. At the second transport step S6, as step S601, under control of the control apparatus 6, the object Q and the respective components R are sequentially gripped by the first hand 51 and transported out of the working space P by movement of the arm 22. That is, the work is performed in the non-assisted work state. As described above, the assist device 9 is decoupled, and thereby, the transportation speed may be increased and the time taken for the step may be shortened.

As in the above described assembly work and disassembly work, the coupled state and the decoupled state of the assist device 9 are switched according to the weight of the object Q, and thereby, when necessary, the object Q may be transported more reliably with assistance from the assist device 9 and, when not necessary, the object Q may be transported more quickly without assistance from the assist device 9. Therefore, according to the working method, transportation of the object Q may be smoothly performed. Particularly, as in the above described working method, work with change in weight is performed on the object Q at the working step S2 and the object Q has the weight equal to or less than the rated weight before the working step S2, however, the projector PRO including the object Q has the weight more than the rated weight after the working step S2. Or, the object Q has the weight more than the rated weight before the working step S5, however, the projector PRO including the object Q has a weight equal to or less than the rated weight after the working step S5. As described above, when it is necessary to transport the object Q having the weight equal to or less than the rated weight at ones of the first transport steps S1, S4 or the second transport steps S3, S6 and transport the object Q having the weight more than the rated weight at the others, if the coupled state and the decoupled state of the assist device 9 may be switched, the above described merits of the working method may be especially enjoyed.

Figure 8:
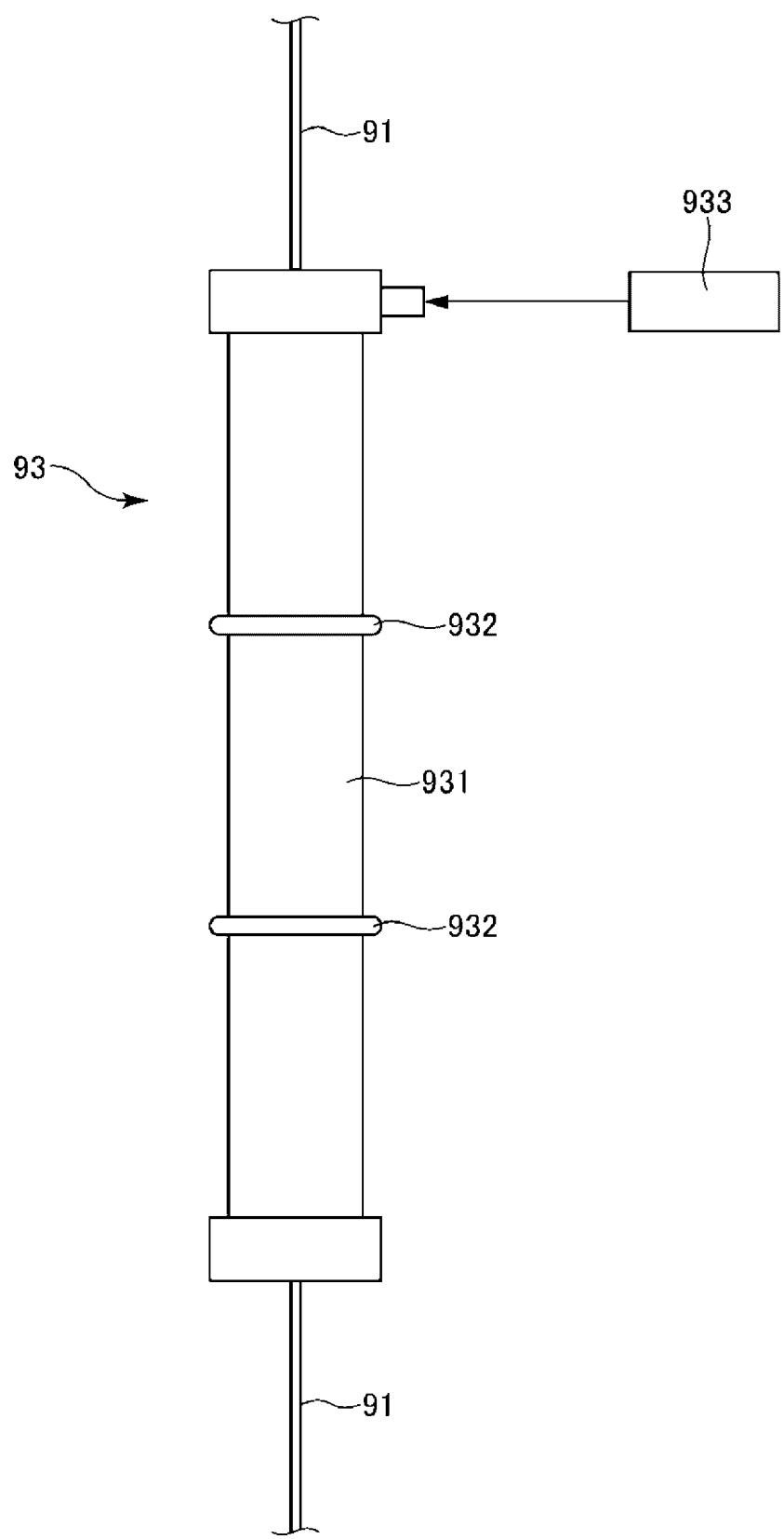
FIG. 8 shows an example of a switching mechanism.
Figure 9:
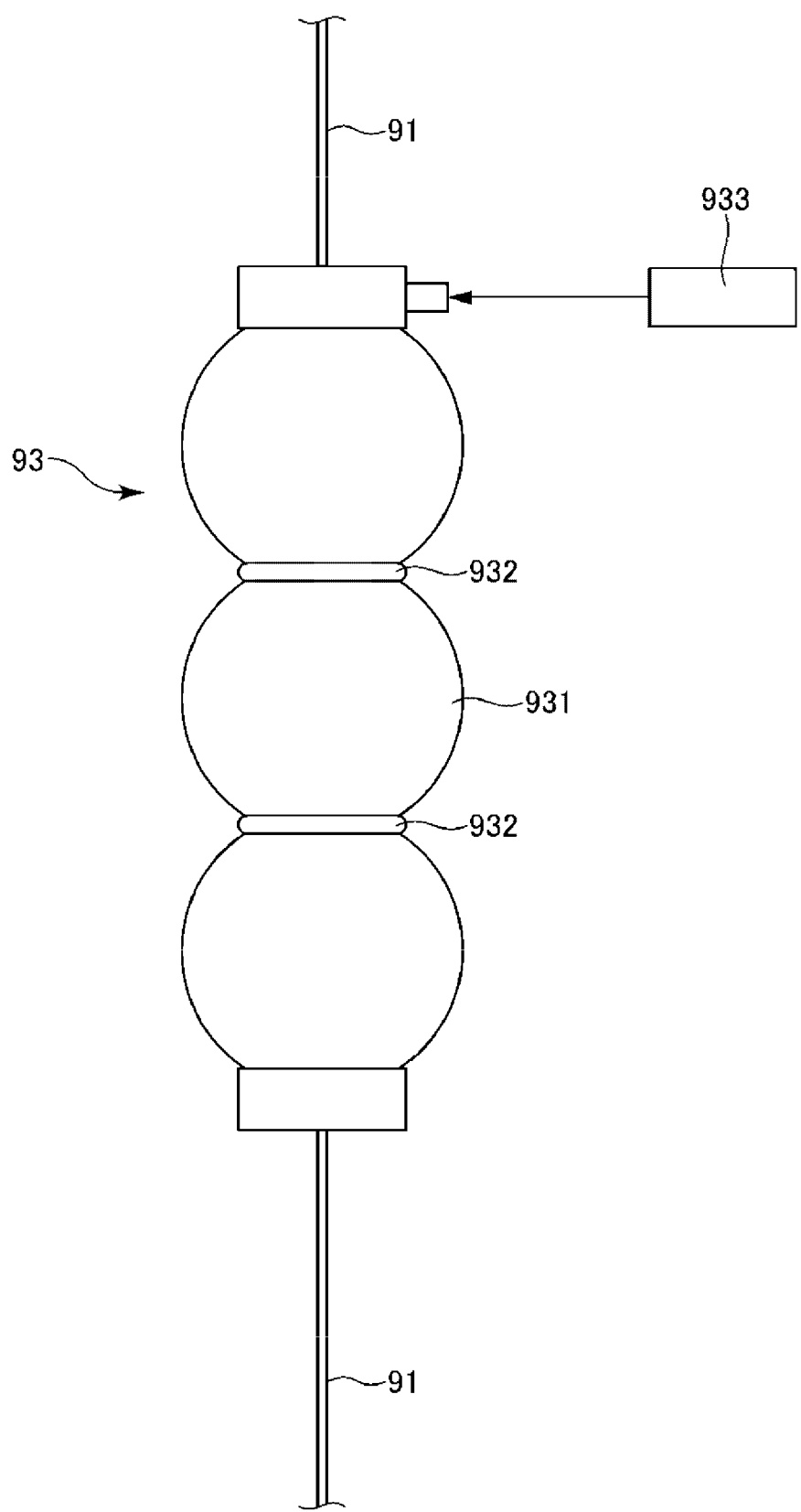
FIG. 9 shows an example of the switching mechanism.

Note that the switching mechanism 93 is not particularly limited as long as the mechanism may switch between the coupled state and the decoupled state. For example, as shown in FIGS. 8 and 9, the switching mechanism 93 has a tube 931 with closed ends, a plurality of rings 932 provided around the outer circumference of the tube 931, an application portion 933 that applies air into the tube 931. The switching mechanism 93 is placed in the middle of the chain 91.

In this configuration, as shown in FIG. 8, the tube 931 is flexible and stretchable unless air is applied into the tube 931 from the application portion 933. Under the condition, even when the hoisting device 92 hoists the chain 91, the tube 931 stretches, and the force is absorbed and not transmitted to the first hand 51 and the first hand 51 is not supported. On the other hand, as shown in FIG. 9, when air is applied into the tube 931, the tube 931 expands and contracts in the longitudinal directions and becomes harder. Under the condition, when the hoisting device 92 hoists the chain 91, the force is transmitted to the first hand 51 via the hard tube 931 and the first hand 51 is supported.

Accordingly, the decoupled state in which the robot 2 is not assisted is obtained without application of air from the application portion 933 into the tube 931, and the coupled state in which the robot 2 is assisted is obtained by application of air from the application portion 933 into the tube 931.

Figure 10:
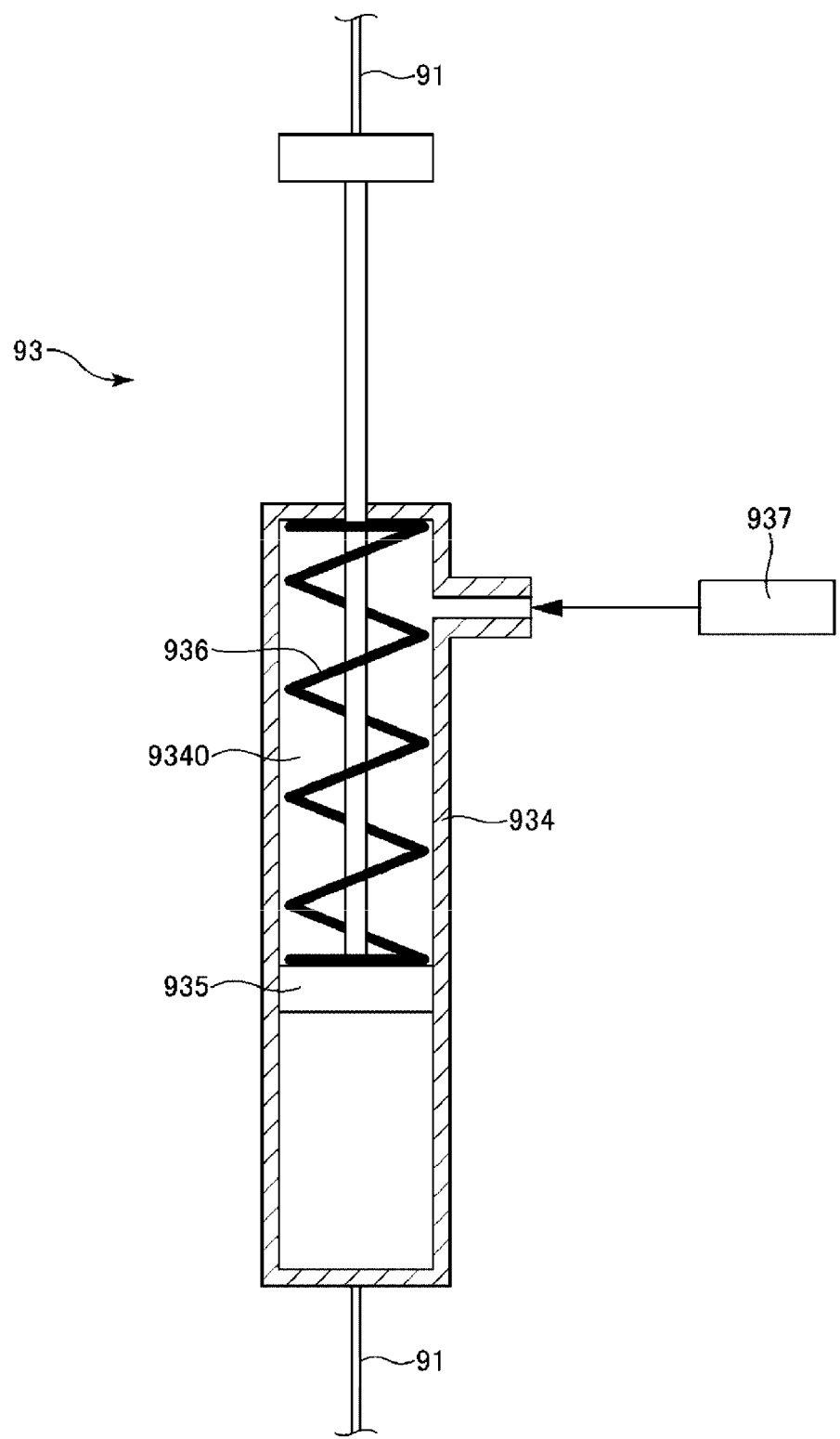
FIG. 10 shows an example of the switching mechanism.
Figure 11:
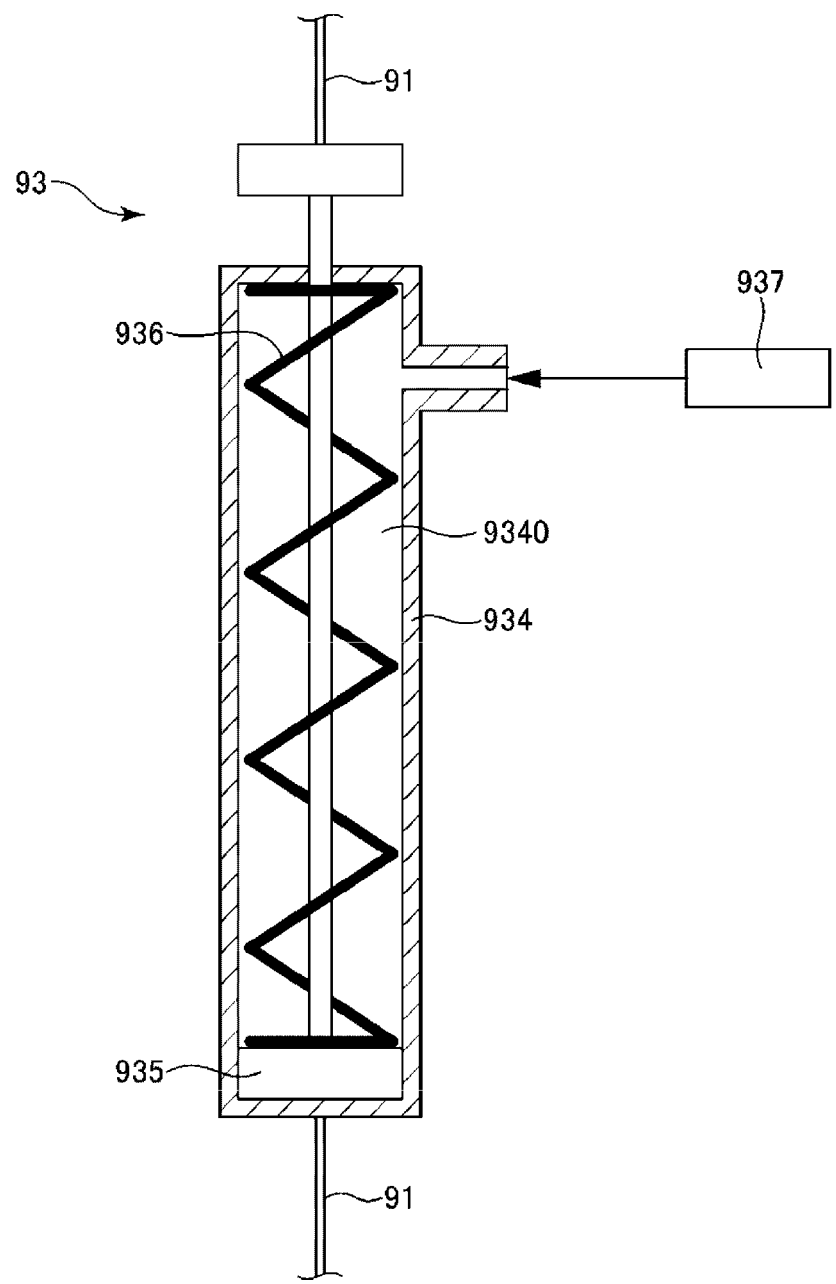
FIG. 11 shows an example of the switching mechanism.

As another example, as shown in FIGS. 10 and 11, the switching mechanism 93 has a cylinder 934, a piston 935 displaceable in upward and downward directions relative to the cylinder 934, a pulling spring 936 urging the piston 935 upward, and an application portion 937 applying air to a space 9340 within the cylinder 934. The switching mechanism 93 is placed in the middle of the chain 91 and the upper end portion of the piston 935 and the lower end portion of the cylinder 934 are coupled to the chain 91.

In this configuration, as shown in FIG. 10, the pulling spring 936 is stretchable unless air is applied into the space 9340 from the application portion 937. Under the condition, even when the hoisting device 92 hoists the chain 91, the pulling spring 936 stretches, and the force is absorbed and not transmitted to the first hand 51 and the first hand 51 is not supported. On the other hand, as shown in FIG. 11, when air is applied into the space 9340, the piston 935 moves to the lower end of the cylinder 934 against the urging force by the pulling spring 936 and the state is held. Under the condition, when the hoisting device 92 hoists the chain 91, the force is transmitted to the first hand 51 via the piston 935 and the cylinder 934 and the first hand 51 is supported.

Accordingly, the decoupled state in which the robot 2 is not assisted is obtained without application of air from the application portion 937 into the space 9340, and the coupled state in which the robot 2 is assisted is obtained by application of air from the application portion 937 into the space 9340.

Figure 12:
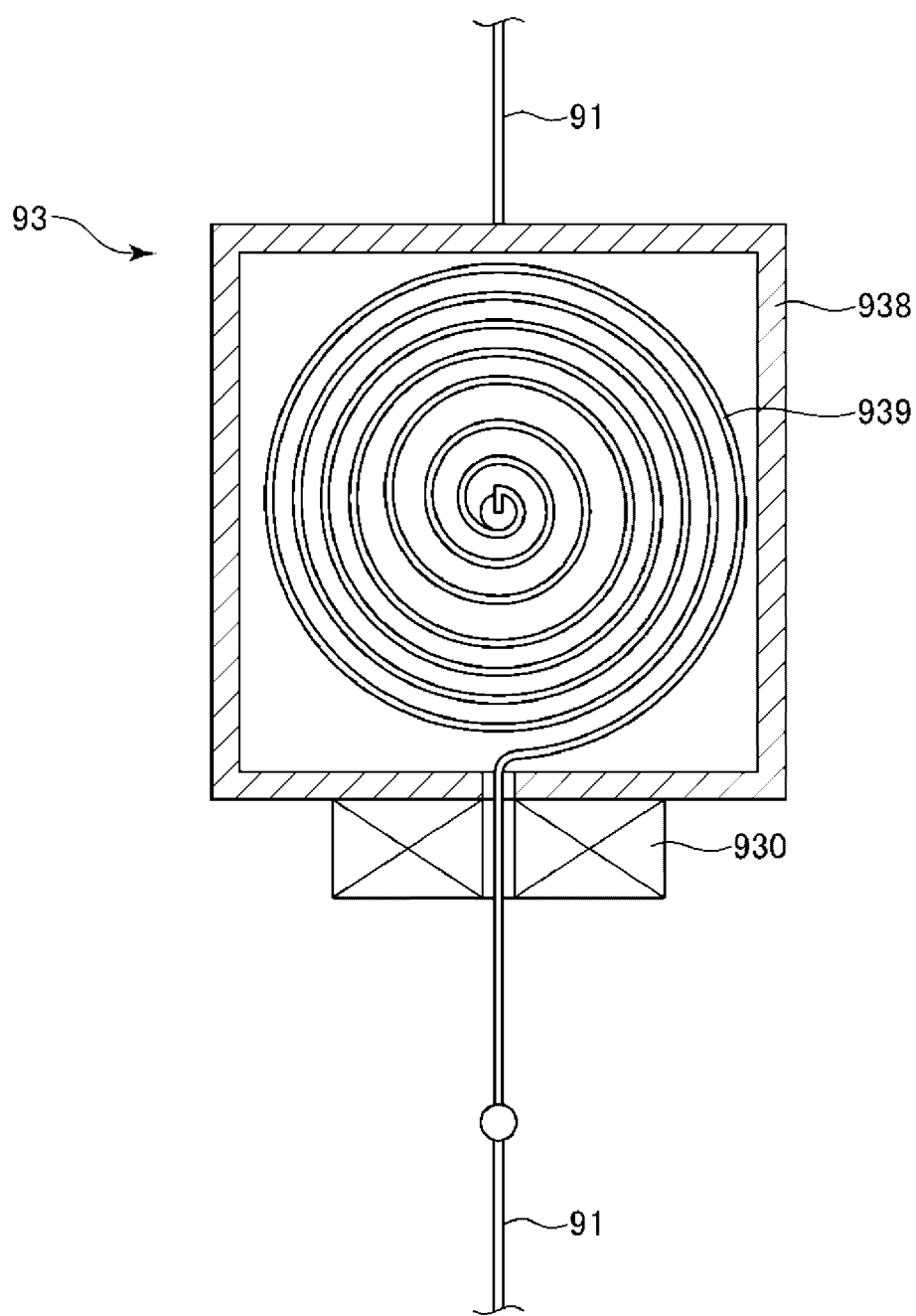
FIG. 12 shows an example of the switching mechanism.

Further, as another example, as shown in FIG. 12, the switching mechanism 93 has a case 938, a spiral spring 939 housed within the case 938, deformed by an external force, and having a part pulled out of the case 938, and a lock mechanism 930 allowing or blocking deformation of the spiral spring 939. The switching mechanism 93 is placed in the middle of the chain 91, and the upper end portion of the case 938 and one end portion of the spiral spring 939 are coupled to the chain 91.

In the configuration, the deformation of the spiral spring 939 is allowed by the lock mechanism 930, and thereby, even when the hoisting device 92 hoists the chain 91, the force is absorbed by the deformation of the spiral spring 939 and not transmitted to the first hand 51 and the first hand 51 is not supported. On the other hand, the deformation of the spiral spring 939 is blocked by the lock mechanism 930, and thereby, when the hoisting device 92 hoists the chain 91, the force is transmitted to the first hand 51 via the case 938 and the spiral spring 939 and the first hand 51 is supported.

Accordingly, the decoupled state in which the robot 2 is not assisted is obtained by allowance of the deformation of the spiral spring 939 by the lock mechanism 930, and the coupled state in which the robot 2 is assisted is obtained by blocking of the deformation of the spiral spring 939 by the lock mechanism 930.

As described above, the working method of the embodiment is the working method of performing work with increase or decrease in weight on the object Q by the robot system 1 having the robot 2, the first hand 51 as a hand coupled to the robot 2 and used, and the assist device 9 assisting the robot 2, including switching between the assisted work state in which work is performed by the robot 2 with assistance from the assist device 9 and the non-assisted work state in which work is performed by the robot 2 without assistance from the assist device 9 according to the weight of the object Q. According to the method, when necessary, the object Q may be transported more reliably with assistance from the assist device 9 and, when not necessary, the object Q may be transported more quickly without assistance from the assist device 9. Therefore, the work may be smoothly performed.

Further, as described above, the working method has the first transport steps S1, S4 of transporting the object Q to the working space P by the robot 2, the working steps S2, S5 of performing work with increase or decrease in weight on the object Q by the robot 2 in the working space P, and the second transport steps S3, S6 of transporting the object Q after the working steps S2, S5 out of the working space P by the robot 2, and, at the first transport steps S1, S4 and the second transport steps S3, S6, the assisted work state and the non-assisted work state are switched according to the weight of the object Q. According to the method, when necessary, the object Q may be transported more reliably with assistance from the assist device 9 and, when not necessary, the object Q may be transported more quickly without assistance from the assist device 9. Therefore, the work may be smoothly performed.

Furthermore, as described above, when the weight of the object Q increases at the working step S2, the first transport step S1 is performed in the non-assisted work state and the second transport step S3 is performed in the assisted work state. Contrarily, when the weight of the object Q decreases at the working step S5, the first transport step S4 is performed in the assisted work state and the second transport step S6 is performed in the non-assisted work state. According to the method, the work may be smoothly performed.

According to the second embodiment, the same effects as those of the above described first embodiment may be exerted.

Third Embodiment

Figure 13:
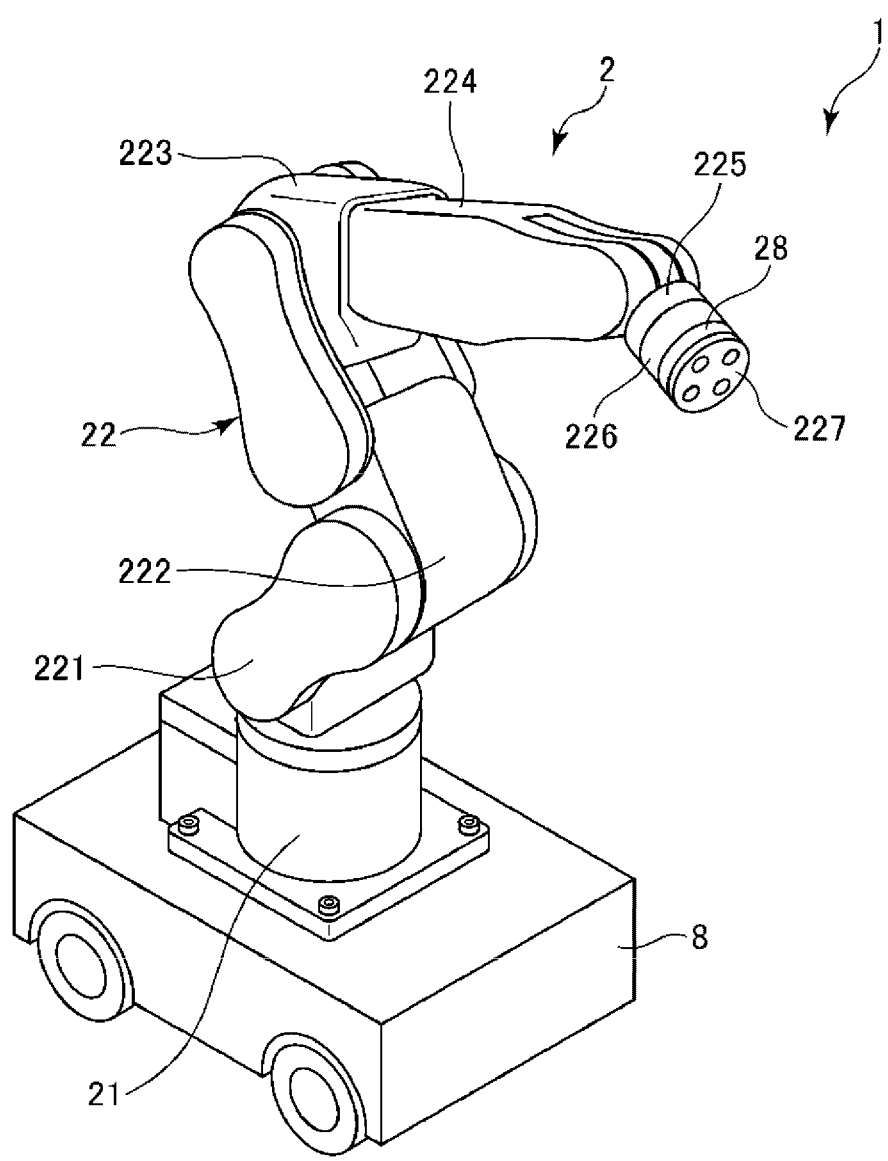
FIG. 13 is a perspective view showing a robot according to a third embodiment of the present disclosure.

FIG. 13 is a perspective view showing a robot according to a third embodiment of the present disclosure.

A robot system 1 according to the embodiment is the same as the robot system 1 of the above described first embodiment except that the robot 2 is placed on an unmanned transport vehicle 8. Accordingly, in the following description, the robot system 1 of the third embodiment will be explained with a focus on the differences from the above described first embodiment and the explanation of the same items will be omitted. In FIG. 13, the same configurations as those of the above described embodiments have the same signs.

As shown in FIG. 13, in the robot system 1 of the embodiment, the robot 2 is placed on the unmanned transport vehicle 8. Accordingly, the robot 2 may move to various locations and the working range thereof is significantly wider. For example, the unmanned transport vehicle 8 travels with the object Q gripped, and thereby, the object Q may be transported from a far place to the working space P and, contrarily, the object Q may be transported from the working space P to a far place. The unmanned transport vehicle 8 is not particularly limited to, but includes e.g. an AMR (Autonomous Mobile Robot) and an AGV (Automatic Guided Vehicle).

According to the third embodiment, the same effects as those of the above described first embodiment may be exerted.

As above, the working method and the robot system according to the present disclosure are explained based on the illustrated embodiments, however, the present disclosure is not limited to those. The configurations of the respective parts may be replaced by arbitrary configurations having the same functions. Or, another arbitrary configuration may be added to the present disclosure. Or, the respective embodiments may be appropriately combined.

What is claimed is:

1. A working method of performing work with increase or decrease in weight on an object by a robot system having a robot, a first hand with an assist device, and a second hand without the assist device, comprising switching between an assisted work state in which the first hand is coupled to the robot and work is performed with assistance by the assist device and a non-assisted work state in which the second hand is coupled to the robot and work is performed without assistance by the assist device according to a weight of the object.

2. The working method according to claim 1, further comprising:

a first transport step of transporting the object to a working space by the robot;

a working step of performing work with increase or decrease in weight on the object in the working space by the robot; and a second transport step of transporting the object after the working step out of the working space by the robot, wherein at the first transport step and the second transport step, the assisted work state and the non-assisted work state are switched according to the weight of the object.

3. The working method according to claim 2, wherein when the weight of the object increases at the working step, the first transport step is performed in the non-assisted work state and the second transport step is performed in the assisted work state.

4. The working method according to claim 2, wherein when the weight of the object decreases at the working step, the first transport step is performed in the assisted work state and the second transport step is performed in the non-assisted work state.

5. A working method of performing work with increase or decrease in:

weight on an object by a robot system having a robot, a hand coupled to the robot and used, and an assist device assisting the robot, the assist device comprises a switching mechanism of switching between a coupled state in which the robot is assisted via the hand and a decoupled state in which the robot is not assisted, comprising switching between an assisted work state in which work is performed by the robot with assistance from the assist device and a non-assisted work state in which work is performed by the robot without assistance from the assist device according to a weight of the object.

6. The working method according to claim 5, further comprising:

a first transport step of transporting the object to a working space by the robot;

a working step of performing work with increase or decrease in weight on the object in the working space by the robot; and a second transport step of transporting the object after the working step out of the working space by the robot, wherein at the first transport step and the second transport step, the assisted work state and the non-assisted work state are switched according to the weight of the object.

7. The working method according to claim 6, wherein when the weight of the object increases at the working step, the first transport step is performed in the non-assisted work state and the second transport step is performed in the assisted work state.

8. The working method according to claim 6, wherein when the weight of the object decreases at the working step, the first transport step is performed in the assisted work state and the second transport step is performed in the non-assisted work state.

9. A robot system comprising:

a robot;

a first hand with an assist device;

a second hand without the assist device; and a control apparatus controlling the robot with the first hand or the second hand coupled thereto to perform work with increase or decrease in weight on an object, wherein the control apparatus switches between an assisted work state in which the first hand is coupled to the robot and work is performed with assistance by the assist device and a non-assisted work state in which the second hand is coupled to the robot and work is performed without assistance by the assist device according to a weight of the object.

10. The robot system according to claim 9, wherein the robot is placed on an unmanned transport vehicle.

11. The robot system according to claim 9, wherein the robot has a force detection sensor that detects a force applied to the robot.

* * * * *